Dec. 15, 1959 H. H. TALBOT 2,917,305
CUSHIONING APPARATUS FOR RECIPROCATING ELEMENTS
Filed Aug. 17, 1953 4 Sheets—Sheet 1

INVENTOR
HOWARD H. TALBOT
BY J. E. Dickinson
HIS ATTORNEY

INVENTOR
HOWARD H. TALBOT
BY J.E. Dickinson
HIS ATTORNEY

Dec. 15, 1959   H. H. TALBOT   2,917,305
CUSHIONING APPARATUS FOR RECIPROCATING ELEMENTS
Filed Aug. 17, 1953   4 Sheets-Sheet 4

INVENTOR.
HOWARD H. TALBOT
BY J. E. Dickinson
His ATTORNEY

United States Patent Office 2,917,305
Patented Dec. 15, 1959

2,917,305

CUSHIONING APPARATUS FOR RECIPROCATING ELEMENTS

Howard H. Talbot, Pittsburgh, Pa., assignor to United Engineering and Foundry Company, Pittsburgh, Pa., a corporation of Pennsylvania Application August 17, 1953, Serial No. 374,670

2 Claims. (Cl. 267—75)

This invention relates to a device for use in combination with a reciprocating mass and refers particularly to an energy absorbing or cushioning device adapted to be combined with a reciprocating flying shear or the like for overcoming the shock due to the very high inertia forces imposed upon the shear and frame as a result of the rapid reversal of motion of the reciprocating elements thereof.

Heretofore, reciprocating flying shears have been limited in their speeds of operation by reason of the fact that means have been lacking therein for effectively cushioning or absorbing the energy incident to reversal of operation of the reciprocating elements. Although various other parts of the shear are seriously affected by the inertia shock forces, bearings in particular fail by reason of the incesant pounding thereon. Since the shock forces increase with the square of the speed of operation, it is readily understood that such a shear, without including a provision for overcoming the destructive effect of the reciprocating forces, must be operated at a relatively low rate of speed. The shear, then, thereby becomes the line-speed-of-operation limiting factor or "bottle neck" when included in a continuous line of strip operations which otherwise might be carried out at a greater and more efficient rate of speed.

The device defined herein includes in combination with a reciprocating flying shear of relatively large width, which shear, for example, may be of the type disclosed in H. H. Talbot United States Patent Number 2,261,007 employing suitable driving mechanism therefor as specifically shown in this reference, a pair of identical cushioning piston-cylinder assemblies with bonnets at the upper portion thereof, the piston of each assembly having the rod thereof connected to the mass defined by the reciprocating frame and the reciprocating elements of the shear. The two assemblies are so connected as to adjustments and operation that they function as an entity. At the center line of each of the cylinders ports or passageways connect with the bonnets thereof, the ports being covered by the pistons when the pistons are at the center position of the stroke. Additional passageways, located at the ends of the cylinders, connect the chambers on either side of the pistons with secondary or variable volume chambers comprising a pair of cylinders in each of which there is a piston which, though normally stationary within the cylinder during operation of the shear, is adapted to be adjusted axially of the cylinder for increasing or decreasing the volumetric capacity thereof. To each of the bonnets there are connected conduits extending from a single or common pressure pilot valve which in turn is connected to a constant high pressure compressed air source adapted to provide the proper initial bonnet, main cylinder and variable volume cylinder pressures against which the pistons contained within the main cylinders may be moving. Adequate slide and pressure regulating valves with pressure balancing elements connected thereto are included in the system so as to maintain at a given value the opposing pressures within the bonnets, main cylinders and variable volume cylinders. Depending upon the length of stroke as well as the speed of operation of the reciprocating shear, the volume of the variable volume cylinders is modified and the initial pressure in the bonnet determined by the system of controls which include therein a variable pressure pump connected to and driven by the shear motor. By use of a device embodying the features of this invention, it is possible to obtain perfect cushioning of the forces caused by reversal of the reciprocating masses of the shear irrespective of the shear speed of operation or length of stroke thereof.

A modified form of the invention includes a variable torque motor connected to a generator driven by the main motor of the shear. For change of speed of the shear motor, more or less torque is developed by the torque motor which in turn will so affect the pressure control valves as to vary the pressure within the bonnets, main cylinders and variable volume cylinders connected thereto.

It is one of the objects of this invention to provide a device for use in combination with apparatus employing reciprocating masses for cushioning and overcoming the effect of the inertia forces imposed by the reversal of operations.

Another object of this invention is to provide a device for use in combination with a reciprocating flying shear adapted to overcome the effect of the inertia forces incident to that caused by reciprocation of the various elements.

Still another object of this invention is to provide a device for use in combination with the variable speed, variable stroke reciprocating mass adapted to oppose and cushion the forces incident to the reversal of direction of travel of said masses.

A further object of this invention is to provide a device for use in combination with a reciprocating flying shear adapted to permit greater speeds of operation thereof by opposing and overcoming the effect of the forces incident to the reversal of direction of travel of the reciprocating portions of the shear by providing the proper compression volume, and initial pressure thereof by which the reciprocating forces are resisted.

These objects, as well as the various other novel features and advantages of this invention, will be apparent from the following description and accompanying drawings of which:

Figure 5 is a sectional view taken at V—V of Figure 1;

Figure 1:
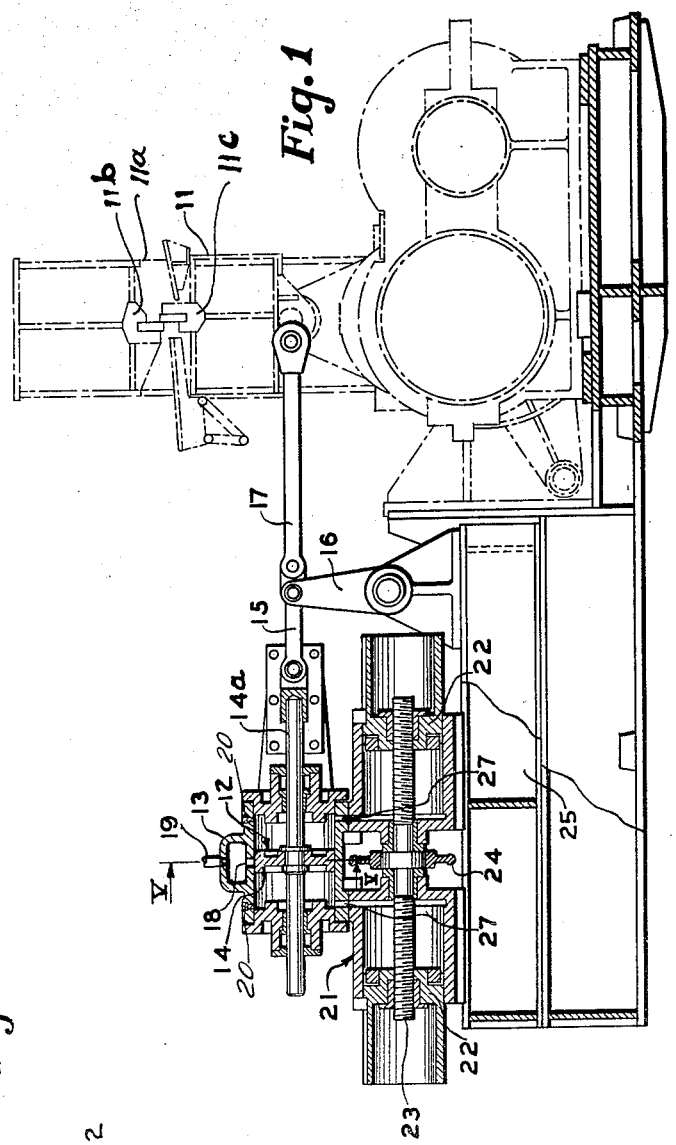
Figure 1 is a side elevation partial sectional view of a device embodying the features of the invention combined with a reciprocating flying shear shown in dot and dash outline.
Figure 2:
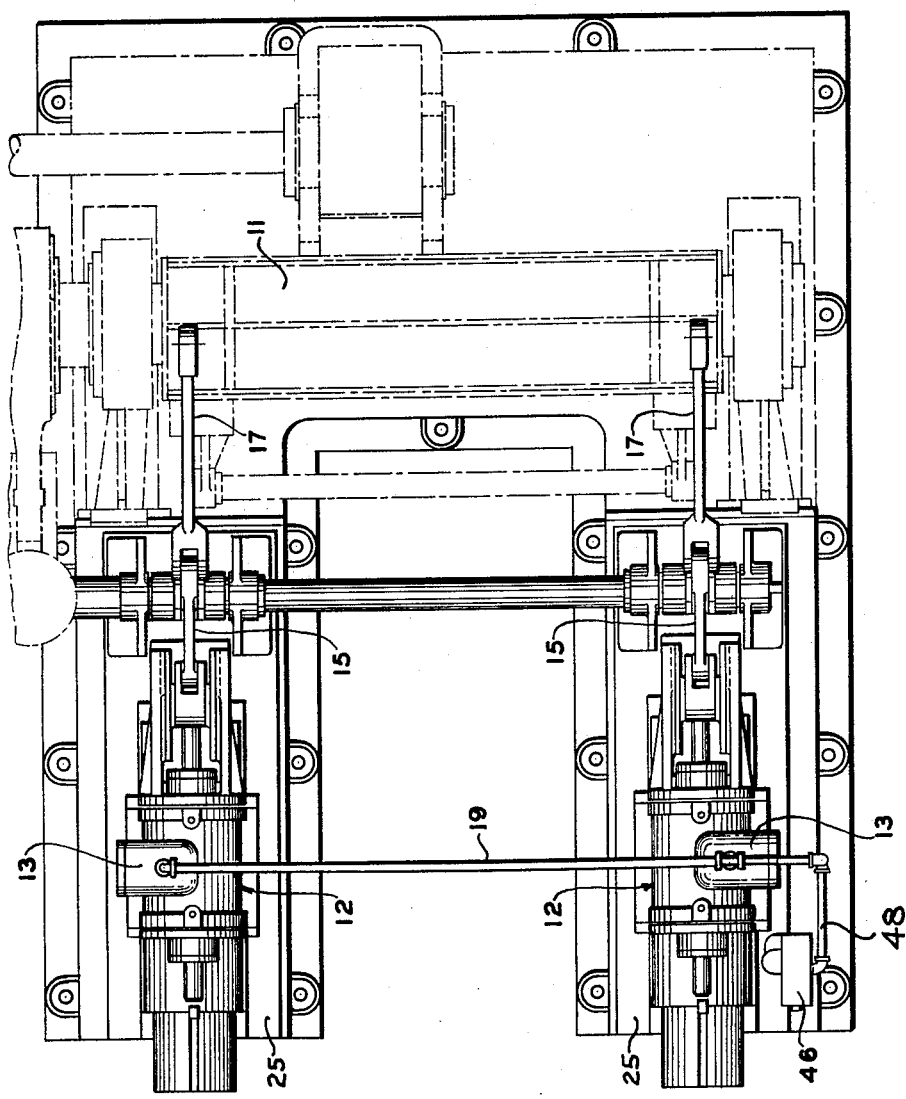
Figure 2 is a plan view of the apparatus shown in Figure 1.

With reference to Figures 1 and 2 of the drawings, there is shown a variable-speed variable-stroke reciprocating flying shear 11, a pair of main shear piston-cylinder assemblies 12 having a bonnet 13 at the top thereof and a reciprocating piston 14 with the piston rod 14a thereof connected by links 15, 16 and 17 to a reciprocating mass comprising a shear frame 11a in which there are mounted blade carriers 11b and 11c adapted to be moved into cutting relationship as the frame is reciprocated back and forth through a uniform distance. The bonnets have secured thereto a fluid conductor 19 which, depending upon the position of the piston, communicates alternately by passageways 18 with the chambers on either side of the piston contained within the main cushion piston-cylinder assemblies 12. To each end of the main piston-cylinder there is provided a threaded opening into which a threaded plug 20 has been inserted. Instead of plugging the ends, under certain high speed conditions, for example, it may be advisable to prevent the pressure within the cylinder from exceeding a certain maximum value and in that event, suitable pressure relief valves could be threaded into the openings. The main cushion piston-cylinder asemblies 12 are supported on secondary or variable volume double piston-cylinder assemblies 21 which are provided with a pair of pistons 22 adapted to be moved toward and away from each other in order to vary the volume of the cylinders thereof by means of right and left hand threaded axial screws 23 operable by a hand wheel 24, for example. Each of the variable volume piston-cylinder assemblies is secured to a base frame 25. The variable volume cylinders are connected to the main piston-cylinder assemblies 12 by passageways 27 providing additional space as may be required and into which the fluid, on being compressed in piston-cylinder assemblies 12, is forced through passageways 27. The volume into which the fluid is finally compressed when the piston 14 moves to either of its two extreme end positions for a given shear stroke is equal to the space remaining between the piston 14 and the end of the cylinder plus the communicating space between the adjustable piston 22 and the cylinder within which it is positioned. The energy thus built up in compressing the fluid within this space, however, is recoverable inasmuch as the action is adiabatic in effect so that as the compressed fluid expands when the piston 14 moves in the opposite direction the main shear driving mechanism is assisted in accelerating the shear.

Although a hand wheel 24 has been shown for illustrative purposes, sprockets with chains passing thereover may preferably be employed for rotating the axial screws whereby through interconnection of the two units adjustments of both will be carried out simultaneously. Also, as the required compression volume varies with the length of stroke of the shear, the adjusting means for the variable volume cylinders preferably will be interconnected with the shear stroke adjusting means so that on adjustment of the shear stroke, adjustment of the variable volume cylinders will take place automatically thereby to provide the correct cushioning volume.

Figure 4:
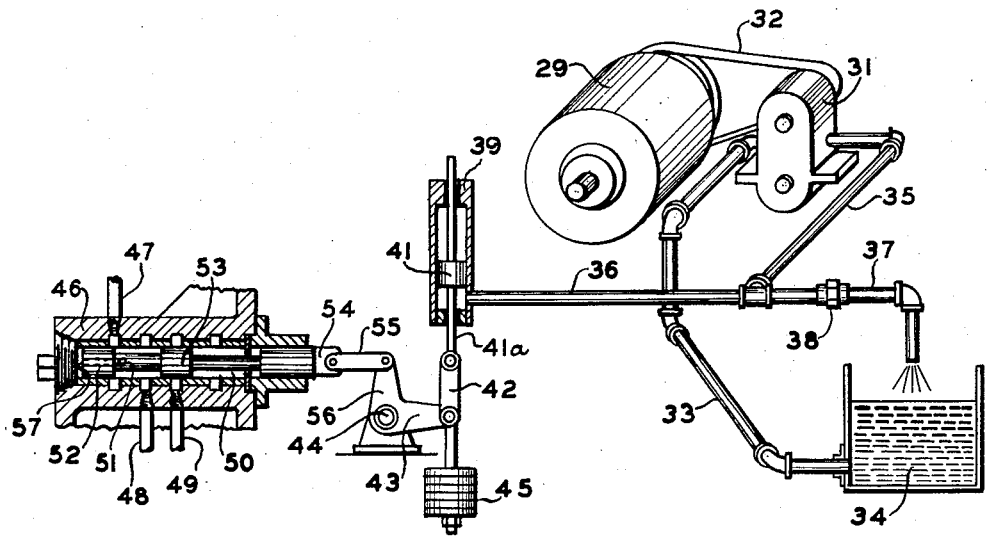
Figure 4 is an enlarged partial sectional view of the control system shown in Figure 3.
Figure 3:
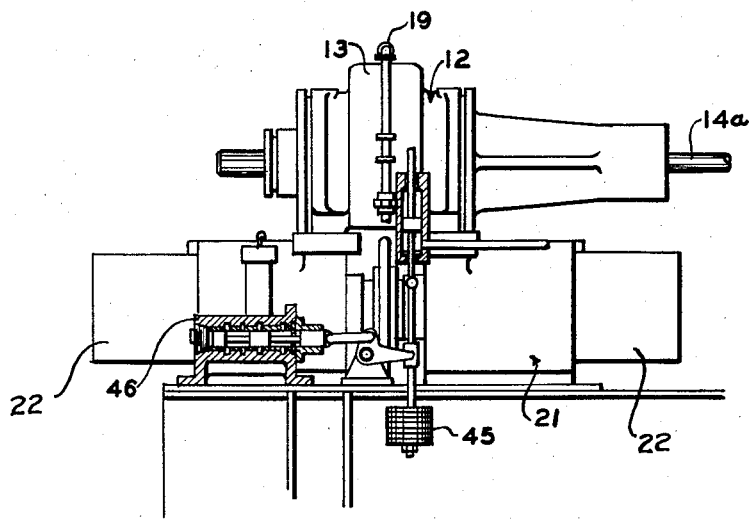
Figure 3 is a side elevation view of a portion of the apparatus incorporating the preferred form of control system embodying the features of the invention.

With reference to Figures 3 and 4, the assemblies and the details of the preferred form of the control system are shown. With particular reference to Figure 4 there are disclosed the main shear motor 29, a rotary gear pump 31 connected thereto by means of a V-belt 32, a suction conduit 33 through which fluid is drawn from a reservoir 34 and a conduit 35 extending from the discharge side of the pump which is connected by a T to conductors 36 and 37, conductor 37 discharging fluid back into the reservoir. Between the T and the discharge end there is a coupling 38 within which a suitable orifice is placed in the system to control the flow of fluid through the conductor 37. Conductor 36 is connected to the lower end of a cylinder 39 within which there is reciprocably mounted a piston 41 the lower end of the piston rod 41a thereof being connected by means of a link 42 to one arm 43 of a bell crank 44. To the same arm of the bell crank there is connected a counterweight 45 which resists the effect of the pressure in conductor 36 to move the piston 41 upwardly. Adjacent to the bell crank there is a pilot valve 46 to which a constant high pressure compressed air source is connected through a conductor 47 and from which a conductor 48 extends and which in turn is connected to the common conductors 19 at the top of the bonnets. An additional conductor 49 is connected to the pilot valve 46 and to the exhaust. Slidably mounted within the cylinder of the pilot valve there is a valve spindle 51 having lands 52 and 53 thereon and a rod 54 connected through an oil dashpot 50 by a link 55 to the other arm 56 of the bell crank 44. An opening 57 is provided at one end of the valve spindle which interconnects the end chamber of the valve body with the chamber between the two lands.

To set out the principal mode of operation of a shear assembly embodying the features of this invention, let it be assumed that the shear is operating at a certain speed and length of stroke, and that both the speed and stroke are to be increased. For a given length of stroke, an increase of the strip speed and hence an increase in the number of reciprocations per minute requires greater cushioning resistance, hence a greater initial or bonnet pressure is required for the entrapped air in the effective compression volume to cause greater final pressure at the end of the stroke. This is necessary in order that the resulting increase in energy of the shear due to increase in speed, the energy being proportional to the square of the speed, will be effectively absorbed in the cushioning chambers inasmuch as the effective cushioning volume remains the same. An increase in the length of stroke of the shear to increase the length of cut requires a greater compression volume in order to avoid overcushioning of the shear. The final volume into which the fluid is compressed being required to be the same, the decrease in final volume in the piston-cylinder assembly 12 being caused by the greater length of stroke of the piston 14 within its cylinder is compensated for by moving the pistons 22 outwardly by the required distance. Thus, in the apparatus herein described, an increase of strip speed requires an increase of bonnet pressure and an increase in the shear stroke requires an increase in the compression volume. Before the change is made, the conditions are such that the variable volume chambers have been set to give the necessary additional compression volume and the required bonnet pressure is constantly maintained. Constant bonnet pressure is provided in the following manner: The pressure of the fluid incident to the rotary gear pump normally tends to raise the piston 41 within the cylinder 39 and to lift the counterweight 45 connected thereto so as to move the pilot valve spindle 51 to the left thus to uncover more of the port connected to the high constant pressure compressed air source. The high pressure air admitted through the port and into the space between the two lands 52 and 53, causes the pressure to increase in the bonnets, main cylinders and variable volume chambers connected thereto. The high pressure is also imposed upon the left end area of the valve spindle being admitted thereto through opening 57 tending to move the spindle to the right to cover the port 47 connected to the constant pressure source and to pull the piston 41 downward. By reason of such action, the valve spindle is caused to hover at the port covering and uncovering position from which it will move slightly toward the left or right thereby to provide the necessary adjustment for maintaining constant the desired pressure within the bonnets, main shear cylinder assemblies and the variable volume chambers. When the speed of the shear and the length of stroke thereof are to be increased, the hand wheel 24 of each of the units is turned so as to move the pistons 22 controlled thereby farther apart thus to increase to the required value the volume within the variable volume compression chambers. As the shear motor speed is increased, the speed of the rotary gear pump increases so that the pressure acting on the piston 41 will increase thereby tending to raise the counterweight 45 and to push the spindle 51 to the left to cause an increase in pressure within the bonnets, the main cylinders and the variable volume chambers. As before, the increased high pressure will act on the left side of the spindle and cause movement thereof to the right. Gradually, the pressure becomes relatively constant and of a preselected given value less than that of the high pressure source thereby causing the pilot valve spindle 51 to hover at the port covering and uncovering positions, the hovering action being dampened by the dashpot 50 connected to the spindle. Any loss in required pressure within the system which may be due to leakage or otherwise is readily made up by slight movement of the spindle to the left to admit additional pressure from the high pressure source. For a given reciprocating mass, and speed and stroke range, the compression volumes, pressures thereof as well as the orifice required in the discharge pipe 37 may be readily calculated and provided to cause perfect cushioning under all operating conditions, for speeds above the relatively low and unobjectionable speed corresponding to that at which the counterweight begins to lift. However, when the shear is slowed down, unless the pressure within the bonnet is reduced, overcushioning at a slower shear speed will result. It is apparent from Fig. 4 that with a slowing down of the shear, the pressure of fluid supplied by the pump 31 to the piston 41 also becomes less so that the pressure acting on the valve control spindle in a direction toward the left, Fig. 4, is also reduced. Inasmuch as the pressure imposed upon the left end area of the control valve spindle is then sufficient to overcome the force supplied by and the action of the piston 41 tending to maintain the spindle in the position as shown, the control valve spindle will then move a sufficient distance to the right to cause the land 52 to cover the port 47 entirely and the land 53 to uncover the port 49 thereby permitting the excess pressure within the bonnet to escape quickly through the valve to the atmosphere. With the sudden release in pressure, the weight 45 will again rise causing the spindle to move again to the left to cover the port 49 and to uncover at least a portion of the port 47 again to permit air under pressure to be admitted to the valve and thence to the cushioning chambers through port 48.

Figure 7:
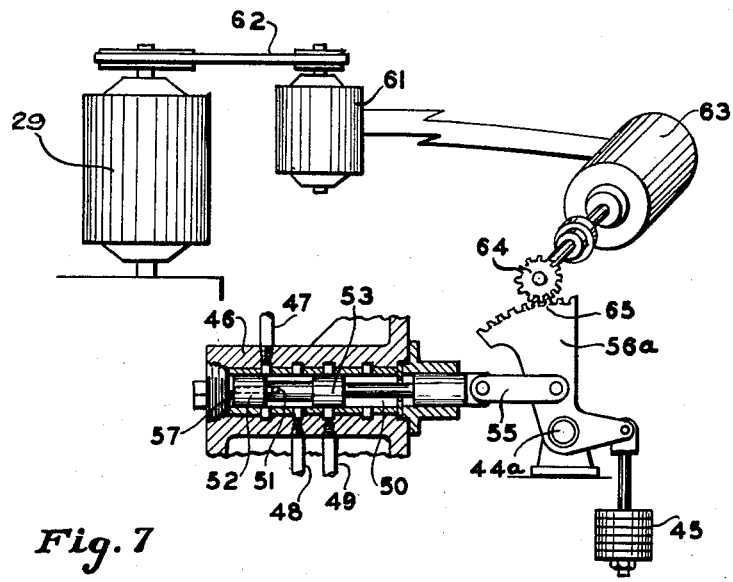
Figure 7 is a partial sectional view of the control system shown in Figure 6.
Figure 6:
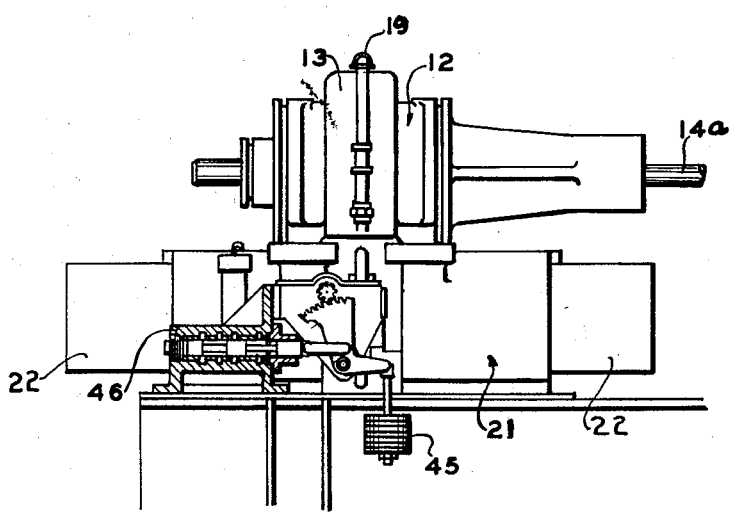
Figure 6 is a side elevation view of a portion of the apparatus incorporating a modified form of the control system.

In the modified form of this invention which is set out in Figures 6 and 7, the pilot valve and counterweight set-up is somewhat the same as in the preferred embodiment. However, instead of having a rotary pump to supply fluid for controlling the system, there is shown a generator 61, which is driven directly by the shear motor through a V-belt 62, and electrically connected to a variable torque motor 63. A pinion 64 is keyed to the shaft of the variable torque motor 63 and is engaged with a gear segment 65 formed on the arm 56a of the bell crank 44a. As the speed of the shear is increased the torque of the motor is increased thus tending to move the pilot valve spindle 51 to the left to uncover the port thereof connected to the high pressure source thus building up the pressure within the pilot valve, the bonnets and the cushioning cylinders and chambers. As in the case of the hydraulically controlled set-up, the pressure builds up to the left of the pilot valve spindle 51 and causes the spindle to move to the right thus to close or partially close the inlet port and to overcome and finally equalize the torque due to the torque motor. Thus the valve in this embodiment also hovers at such a position as to maintain the pressure within the bonnet, main shear cylinders and variable volume chambers at a constant value, which represents the initial pressure against which the piston of the main shear piston-cylinder assembly 12 acts in compressing the fluid.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. An energy absorbing system for use with a mass and means for reciprocating said mass back and forth through a uniform distance comprising a single piston connected to said mass, a cylinder having closed ends and enclosing said piston and so disposed as to permit moevment of said piston therein an equal distance in opposite directions with respect to the ends of said cylinder during reciprocation of said mass, a closed chamber on each side of said piston, pressure control means having an inlet connected to a source of constant high pressure and an outlet connected to said cylinder at a point substantially mid-way between the ends thereof and means within said pressure control means operably connected to said means for reciprocating said mass and responsive to the speed thereof and having a valve adjusted thereby for causing said control means to impose a predetermined initial pressure in said chambers increasing in intensity with an increase in speed of said mass alternately on one side and then on the other side of said piston.

2. An energy absorbing system for use with a mass which is reciprocated back and forth through a uniform distance according to claim 1 including means operably connected to the ends of said cylinder for varying the initial volume of said chambers to be subjected to the predetermined initial pressure.

References Cited in the file of this patent

UNITED STATES PATENTS

| | | |
|---|---|---|
| 120,041 | Cottrell | Oct. 17, 1871 |
| 355,865 | Cottrell | Jan. 11, 1887 |
| 1,146,947 | Norton | July 20, 1915 |
| 1,155,568 | Herman | Oct. 5, 1915 |
| 1,192,353 | Stevens | July 25, 1916 |
| 1,192,354 | Stevens | July 25, 1916 |
| 1,668,777 | Marstersteck | May 8, 1928 |
| 1,838,802 | Bischof | Dec. 29, 1931 |
| 1,850,423 | Taylor | Mar. 22, 1932 |
| 1,903,775 | Christopher | Apr. 18, 1933 |
| 2,172,346 | Burns | Sept. 12, 1939 |
| 2,261,007 | Talbot | Oct. 28, 1941 |

FOREIGN PATENTS

| | | |
|---|---|---|
| 721,993 | Germany | Apr. 10, 1940 |